June 12, 1951     J. J. MORRISSEY     2,556,932
FISHING FLOAT
Filed Dec. 21, 1949
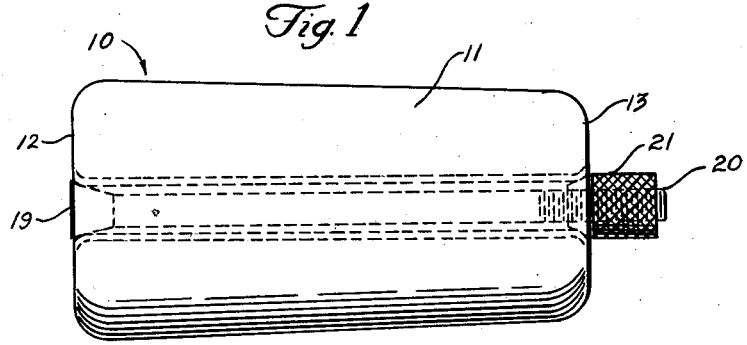
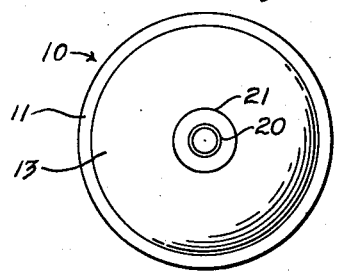
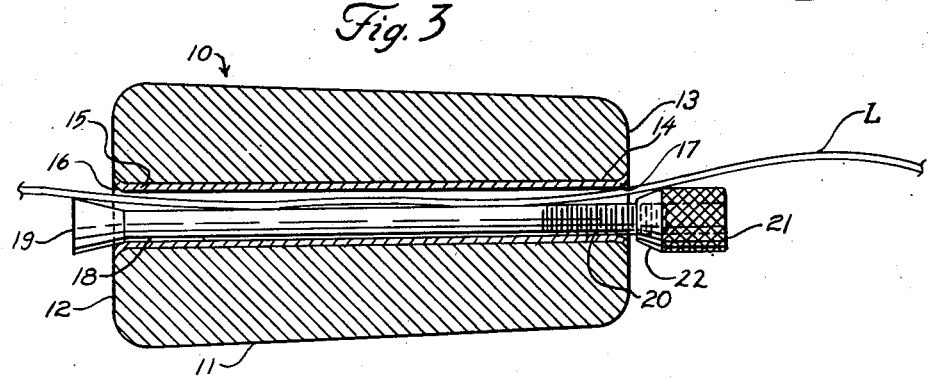
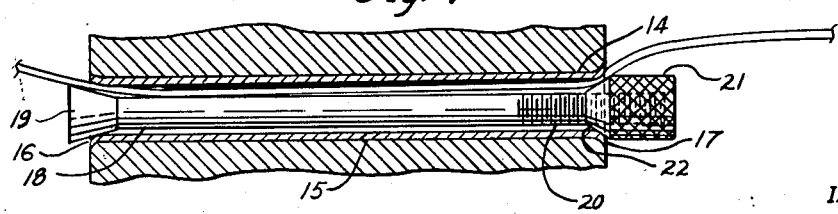
INVENTOR.
JOHN J. MORRISSEY
BY *H. G. Manning*
ATTORNEY Patented June 12, 1951

2,556,932

UNITED STATES PATENT OFFICE 2,556,932

FISHING FLOAT

John J. Morrissey, Torrington, Conn.

Application December 21, 1949, Serial No. 134,188

3 Claims. (Cl. 43—44.91)

1

This invention relates to fishing floats, and more particularly to a float having means for clamping the float firmly at any desired position upon the length of the fishline.

One object of this invention is to provide a device of the above nature which will not accidentally change its position on the fishline.

Another object is to provide a device of the above nature which may be easily adjusted with respect to the fishline when desired by the user.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawing:

Fig. 1 is a side view of the improved fishing float.

Fig. 2 is a right-hand end view of the float shown in Fig. 1.

Fig. 3 is a longitudinal sectional view of the same, showing the float in an unclamped condition, permitting the float to be adjusted longitudinally upon a length of fishline extending therethrough.

Fig. 4 is a fragmentary sectional view, similar to a portion of Fig. 3, but showing the float clamped in fixed position upon the fishline.

Referring now to the drawing, in which like reference numerals denote corresponding parts throughout the several views, the numeral 10 indicates a body which is made of suitable lightweight material, such as balsa wood, and which has a tapered outer surface 11, and flat ends 12, 13.

The body 10 is provided with a central cylindrical longitudinal passageway 14 which contains a tubular core 15 of any suitable durable material such as aluminum, having its opposite ends 16, 17 flared for holding said core within the body 10.

In order to clamp a fishline L immovably within the tubular core 15, provision is made of a clamping rod 18 which is loosely received within the tubular core 15, and which is provided with a frusto-conical metallic head 19 at one end thereof for clamping the line L against the flared tube portion 16.

The opposite end portion 20 of the rod 18 is threaded and carries a knurled thumb nut 21 having a frusto-conical end surface 22 adapted

2 to clamp the fishline L against the flared tube portion 17.

Operation

In operation, the thumb nut 21 will first be loosened upon the rod 18 so as to permit the fishline L to be inserted through the tubular core 15. If desired, the thumb nut 21 may be detached from the rod 18 so as to permit complete removal of said rod and facilitate the insertion of the line L in the core 15.

After the fishline L has been placed in the desired position within the float, the rod 18 will be inserted within the tubular core 15 and the thumb nut 21 tightened thereon, so that the head 19 and the nut 21 will have a wedging action in the flared core portions 16, 17 which will firmly clamp the fishline L at both ends of the float.

Thus, it will be seen that the float may be firmly anchored in the desired position upon the fishline L and cannot accidentally change its adjustment.

However, if at any time the user should desire to change the location of the float upon the fishline L, it will merely be necessary to loosen the thumb nut 21, so as to permit the float to be moved along the fishline L to the desired location, after which the thumb nut 21 will be tightened.

The rod 18 preferably will be so inserted that the thumb nut 21 will be disposed at the smaller end of the body 10, thus distributing the weight of the float so that the larger end thereof will always float uppermost, and permitting the device to float in a stable manner.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a fishing float, a body having a longitudinal passageway therethrough, a tubular core in said passageway and adapted to receive a fishline, a rod extending through said tubular core, a head integrally formed on one end of said rod and adapted to engage one end of said core, and a nut threaded on the other end of said rod and adapted to engage the other end of said core, whereby the fishline may be clamped against the ends of the core.

2. In a fishing float, a body having a longitudinal passageway therethrough, a tubular core in said passageway and adapted to receive a fishline, a rod extending through said tubular core, a head integrally formed on one end of said rod, and a nut threaded on the other end of said rod, said head and said nut having frusto-conical surfaces for wedging engagement in respective ends of said core, whereby the fishline may be clamped by said head and said nut at opposite ends of the core.

3. In a fishing float, a body having a longitudinal passageway therethrough, a tubular core in said passageway and adapted to receive a fishline, said tubular core having flared end portions for retaining said core in said body, a rod extending through said tubular core, a head integrally formed on one end of said rod, and a nut threaded on the other end of said rod, said head and said nut having frusto-conical surfaces for clamping the fishline within the flared end portions of said core.

JOHN J. MORRISSEY.

REFERENCES CITED

The following references are of record in the file of this patent:

UNITED STATES PATENTS

| Number | Name | Date |
|---|---|---|
| 943,506 | Wooton | Dec. 14, 1909 |
| 1,243,768 | Scott | Oct. 23, 1917 |
| 1,507,316 | Kemper et al. | Sept. 2, 1924 |
| 1,598,577 | Hawkinson et al. | Aug. 31, 1926 |
| 1,973,502 | Olson | Sept. 11, 1934 |
| 2,162,821 | Parmenter | June 20, 1939 |
| 2,223,823 | Hampton | Dec. 3, 1940 |
| 2,315,048 | Croft | Mar. 30, 1943 |
| 2,483,788 | Smith | Oct. 4, 1949 |